United States Patent
Arsenault et al.

(10) Patent No.: US 6,925,650 B1
(45) Date of Patent: Aug. 2, 2005

(54) METHOD AND APPARATUS FOR AUTOMATED CREATION OF LINKING INFORMATION

(75) Inventors: Robert G. Arsenault, Redondo Beach, CA (US); Jeffrey A. Brown, Roseville, MN (US); Craig A. Finseth, St. Paul, MN (US); Philip E. Hsiao, Eden Prairie, MN (US)

(73) Assignee: Hughes Electronics Corporation, El Segundo, CA (US)

( * ) Notice: Subject to any disclaimer, the term of this patent is extended or adjusted under 35 U.S.C. 154(b) by 739 days.

(21) Appl. No.: 09/643,122

(22) Filed: Aug. 21, 2000

(51) Int. Cl.$^7$ ............................ H04N 5/445; G06F 3/00; G06F 13/00
(52) U.S. Cl. ............................ 725/39; 725/40; 725/44; 725/45; 725/47; 725/53
(58) Field of Search ........................ 725/39–40, 44–45, 725/47, 53

(56) References Cited

U.S. PATENT DOCUMENTS

| | | | |
|---|---|---|---|
| 5,686,954 A | * 11/1997 | Yoshinobu et al. | 725/53 |
| 5,903,816 A | 5/1999 | Broadwin et al. | 455/3.1 |
| 6,008,803 A | 12/1999 | Rowe et al. | 345/327 |
| 6,018,768 A | 1/2000 | Ullman et al. | 709/218 |
| 6,025,837 A | 2/2000 | Matthews, III et al. | 345/327 |
| 6,151,059 A | 11/2000 | Schein et al. | 348/13 |
| 6,172,677 B1 | 1/2001 | Stautner et al. | 345/352 |
| 6,199,206 B1 | 3/2001 | Nishioka et al. | 725/51 |
| 6,216,264 B1 | * 4/2001 | Maze et al. | 725/53 |
| 6,263,501 B1 | 7/2001 | Schein et al. | 725/39 |
| 6,268,849 B1 | 7/2001 | Boyer et al. | 345/327 |
| 6,341,374 B2 | * 1/2002 | Schein et al. | 725/43 |
| 6,392,664 B1 | * 5/2002 | White et al. | 725/136 |
| 6,442,755 B1 | 8/2002 | Lemmons et al. | 725/47 |
| 6,463,428 B1 | * 10/2002 | Lee et al. | 707/3 |
| 6,469,753 B1 | 10/2002 | Klosterman et al. | 348/906 |
| 6,481,010 B2 | * 11/2002 | Nishikawa et al. | 725/44 |
| 6,522,342 B1 | 2/2003 | Gagnon et al. | 345/716 |
| 6,601,238 B2 | * 7/2003 | Morrison et al. | 725/50 |
| 6,631,523 B1 | * 10/2003 | Matthews et al. | 725/53 |
| 6,665,870 B1 | 12/2003 | Finseth et al. | 725/40 |

* cited by examiner

*Primary Examiner*—John Miller
*Assistant Examiner*—Michael W. Hoye

(57) ABSTRACT

A method and apparatus for transmitting, receiving and displaying electronic program guide data having a number of segments, wherein each segment is associated with a program and wherein some of the segments have a keyword therein includes a receiver having a memory that stores a keyword list containing the keyword or keywords. The receiver receives the program guide data and compares the segments of the program guide data to the keyword list to determine if any keywords are contained in the segments. The receiver displays the keyword on a display screen so that the keyword may be selected by the user.

27 Claims, 9 Drawing Sheets

METHOD AND APPARATUS FOR AUTOMATED CREATION OF LINKING INFORMATION

BACKGROUND OF THE INVENTION

The present invention relates to electronic television program guides, and particularly to a method and apparatus for creating links to information that is common between a number of television programs or films that are broadcast as television programming.

Television programs are distributed to viewers by a variety of broadcasting methods. These methods include traditional analog broadcast television, digital broadcast television, cable television (both analog and digital), satellite broadcasting (both analog and digital) and other methods. Digital broadcast methods allow channels to be multiplexed and transmitted over a common transmission medium. Because television broadcasting systems may have hundreds of channels having vast amounts of programming content, there must be some mechanism for informing views of the content available on the various channels. Electronic television program guides have proven to be an effective means for providing channel content information.

Electronic television program guides (EPGs) have become quite popular in satellite and cable-based television systems. EPGs may contain program information such as program titles, program descriptions, lists of credits, etc. Program information may be presented in many ways. For example, program information may appear in multiple languages, in various lengths, and may be written for different audiences (e.g., adult vs. children).

Typical EPGs list a plurality of channel names or numbers in a vertical column along the left side of a television screen, and list a plurality of time slots in a horizontal row across the top of the television screen. At the intersection of each channel and time slot is a "cell" that typically displays the title of the program that is being shown on that channel at that time. Despite the increasing popularity of EPGs, there are many problems and inefficiencies with the current systems and methods for transmitting, receiving and displaying program guide data.

Presently, devices that receive EPG information do not maintain internal keyword tables or indices of data that identify data elements having common characteristics with other data elements. Additionally, present receivers and systems do not use such tables to display world-wide-web-type hyperlinks that allow users to quickly access related information. Rather, current systems require users to conduct searches for related information, or access screens that display groupings of information. Additionally, current systems do not provide an immediate indication of the availability of related information. Due to the increasing amount of information being sent in many television broadcasting systems, receiving devices that maintain keyword tables and display links to access related information would be very useful in helping to organize and access the vast quantity of transmitted information. Additionally, keyword tables may be used by receivers to aid users in entering data, by comparing partial user entries to the keyword tables, and completing the entry for the user. The use of keyword tables for entry completion helps eliminate the difficult and time consuming task of entering data with a remote control.

BRIEF SUMMARY OF THE INVENTION

In one aspect, the present invention may be embodied in a system for transmitting, receiving and displaying program guide data on a display screen. The system may include a program guide database storing program guide data having a number of segments, each segment may be associated with a program, some segments may have a keyword therein. The system may also include a transmitter communicatively coupled to the program guide database and adapted to receive program guide data from the program guide database and to transmit the program guide data over a broadcast channel and a tuner tuned to the broadcast channel and adapted to receive the program guide data from the broadcast channel. The system may further include a memory storing a keyword table having the keyword therein and a processor coupled to the tuner and the memory, the processor programmed to compare each segment of the program guide data to the keyword table to determine which segments have the keyword therein, to link to the keyword to programs associated with the segments having the keyword therein and to display the keyword on the display screen.

Each program may have an associated name and the processor may be further programmed to display on the display screen a list of names of programs associated with the segments having the keyword therein, when the keyword is selected on the display screen.

Additionally, the processor may be programmed to display on the display screen a program associated with a name from the list of names of programs when the name of that program is selected from the list of names of programs.

In some embodiments, program may have associated program information and the processor may be programmed to display the program information associated with a program when the name of that program is selected from the list of names of programs. Optionally, the keyword may be displayed in a highlighted fashion.

The keyword may be associated with a number of different concepts. For example, the keyword may be a name of an actor in a program, a category of programs or a name of a director of a program. Additionally, the keyword table may be stored in the memory by information sent of over the broadcast channel.

According to a second aspect, the present invention may be embodied in a receiver for use with a transmitter transmitting program guide data over a broadcast channel, wherein the program guide data may have a number of segments and each segment may be associated with a program, some segments may have a keyword therein. The receiver may include a tuner tuned to the broadcast channel, the tuner receiving the program guide data from the broadcast channel, a memory storing a keyword table having the keyword therein and a processor coupled to the tuner and the memory, the processor programmed to compare each segment of the program guide data to the keyword table to determine which segments of the plurality of segments have the keyword therein, to link to the keyword to programs associated with the segments having the keyword therein and to display the keyword on a display screen.

According to a third aspect, the present invention may be embodied in a method for creating linking information from program guide data transmitted on a broadcast channel, wherein the program guide data may have a number of segments and each segment may be associated with a program, and wherein some segments may have a keyword therein. The method may include the steps of receiving the program guide data from the broadcast channel, comparing the program guide data to a keyword table to determine which segments have the keyword therein, linking the keyword to programs associated with the segments having the keyword therein and displaying the keywords contained in the program guide data on a display screen.

The invention itself, together with further objects and attendant advantages, will be least understood by reference to the following detailed description, taken in conjunction with the accompanying drawings.

DETAILED DESCRIPTION OF THE PREFERRED EMBODIMENTS

I. Transmission of Program Guide Data

Figure 1:
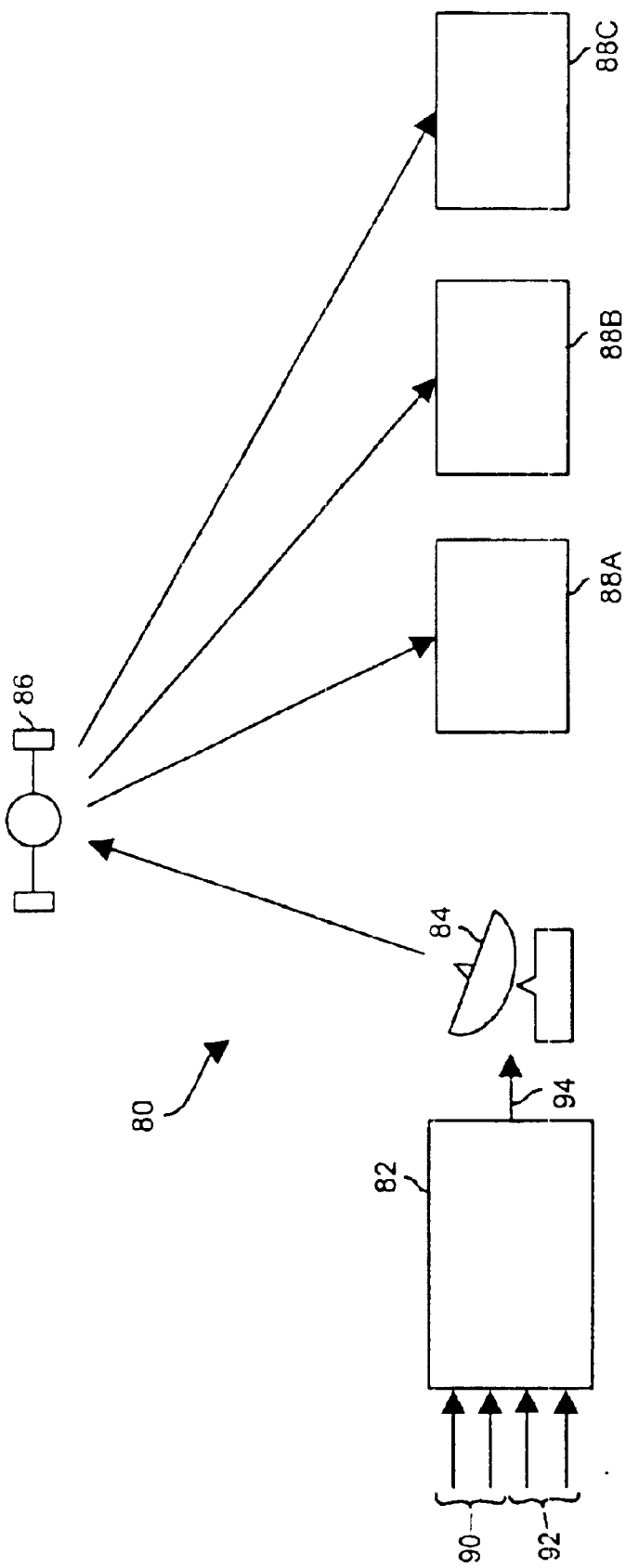
FIG. 1 illustrates a system for the transmission, receipt and display of electronic program guide data.

FIG. 1 is a block diagram of an electronic program guide delivery system 80 that transmits and receives audio, video and data signals, via satellite. Although the present invention is described in the context of a satellite-based system for delivery of program guide data, the techniques described herein are equally applicable to other methods of delivery of program guide data, such over-the-air systems and cable-based systems.

The electronic program guide delivery system 80 includes a transmission station 82, an uplink dish 84, a satellite 86, and receiver stations 88A–88C (collectively referred to as receiver stations 88). The transmission station 82 includes a plurality of input lines 90 for receiving various signals, such as analog television signals, digital television signals, video tape signals and original programming signals. Each input line 90 typically corresponds to a single television channel. The transmission station 82 also receives a plurality of schedule feeds 92, which provide electronic schedule information about the timing and content of various television channels, such as that found in television schedules contained in newspapers and television guides. The electronic schedule information from the schedule feeds 92 is converted into program guide data by the transmission station 82.

The transmission station 82 receives and processes the various input signals received on the input lines 90 and the schedule feeds 92, converts the received signals into a standard form, combines the standard four signals into a output data stream 94, and sends the output data stream 94 to the uplink dish 84. The output data stream 94 may be a modulated signal that is modulated by the transmission station 82 using standard frequency and polarization modulation techniques. The output data stream 94 may be multiplexed signal including 16 frequency bands. The transmission station 82 is described in further detail below with respect to FIG. 2.

The uplink dish 84 receives the output data stream 94 from the transmission station 82, amplifies the received signal and transmits the signal to the satellite 86. Although a single uplink dish 84 and satellite 86 are shown in FIG. 1, multiple uplink dishes and satellites may be used to provide additional system bandwidth, and to ensure continuous delivery of signals to the receiver stations 88.

The satellite 86 may rotate in geosynchronous orbit about the earth. The satellite 86 may include a plurality of transponders (not shown) that receive signals transmitted by uplink dish 84, amplify and frequency shift the received signals, and transmit the amplified, frequency shifted signals to the receiver stations 88. A total of 32 transponders may be used by the satellite 86 in accordance with the present invention.

The receiver stations 88 receive and process the signals transmitted by the satellite 86. The receiver stations 88 include hardware and software for separating the electronic program guide data from the received signals, and processing and displaying the electronic program guide data. The receiver stations 88 are described in further detail below with respect to FIG. 4.

Figure 2:
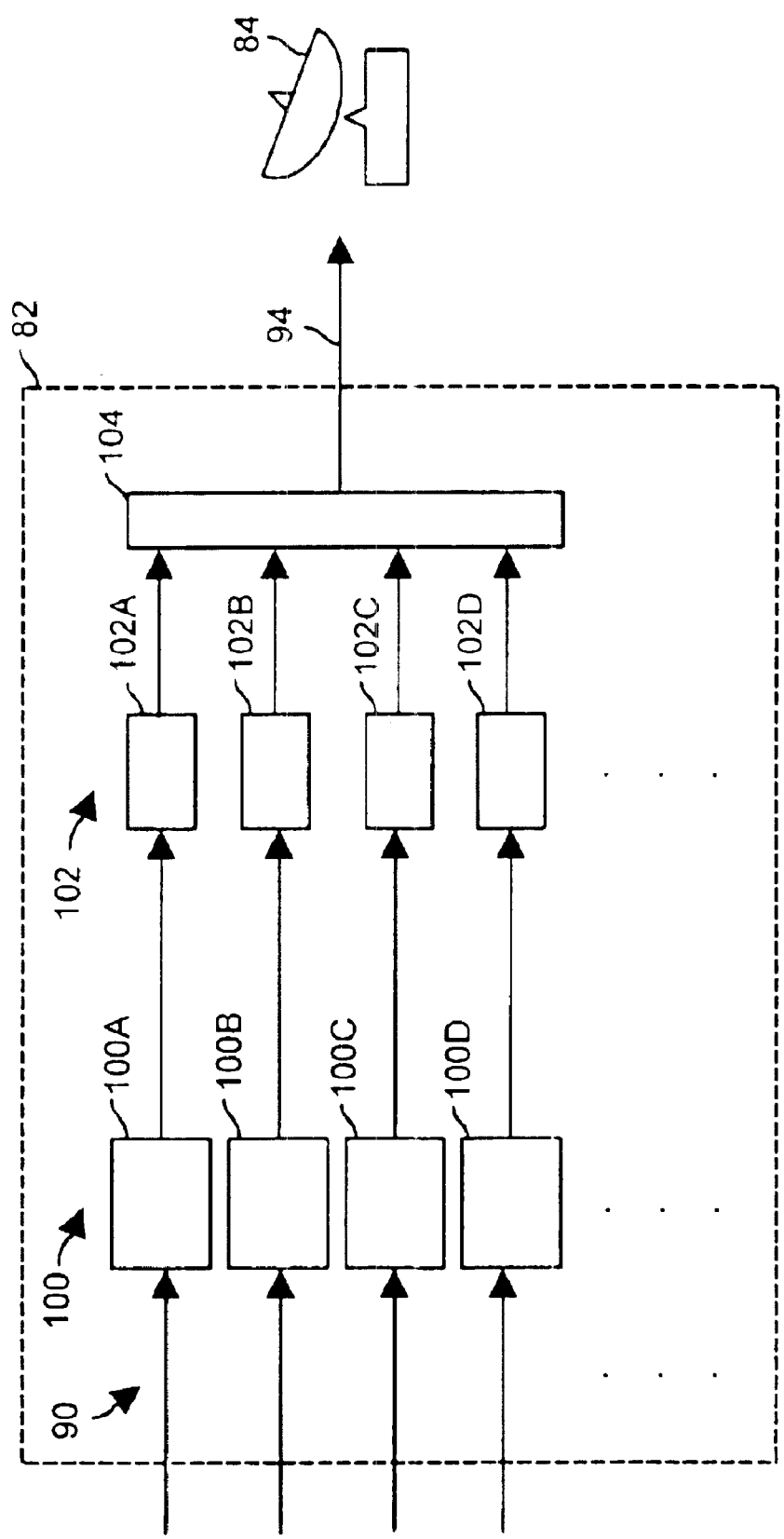
FIG. 2 illustrates further detail of the transmission station of the system of FIG. 1.

As shown in FIG. 2, the transmission station 82 may include input signal adapters 100A–100D (collectively referred to as input signal adapters 100), analog to digital (A/D) converters 102A–102D (collectively referred to as A/D converters 102), and a combiner 104. The input signal adapters 100 are coupled to the A/D converters 102, and the A/D converters 102 are coupled to the combiner 104. Although four input signal adapters 100 and four A/D converters 102 are shown in FIG. 2, more or fewer may be used.

The input signal adapters 100 receive input signals from the input lines 90, and convert the input signals to a standard form. As mentioned above, the signals from the input lines 90 may include analog television signals, digital television signals, video tape signals and original programming signals. The input signal adapters 100 convert the input signals to a high quality analog format. The high quality analog signals are output by the input signal adapters 100 to the A/D converters 102. The A/D converters 102 convert the high quality analog signals received from the input signal adapters 100 to digital signals, and may compress the digital signals using MPEG2 encoding, although other compression schemes may be used.

During the MPEG2 encoding step, the AID converters 102 may also perform a statistical multiplexing operation. During the statistical multiplexing operation, the A/D converters 102 determine the amount of bandwidth that each channel will use. The A/D 102 converters determine the amount of bandwidth allowed for each channel based upon the content of the signal on that channel, and the amount of bandwidth used by other channels. For example, a signal representative of a program such as the motion picture "Independence Day," which has a very dynamic picture content with a great deal of movement and numerous bright explosions, cannot be compressed as much as a more static video signal like a video signal associated with an information channel (e.g., a weather channel). The greater the dynamic content of a signal, the less the signal can be compressed and the greater the bandwidth required for the transmission of the signal.

Typically, 30 megabits per second (MBPS) of data are transmitted from the uplink dish 84 for each transponder in the satellite 86. Each transponder receives and transmits data for about 6 channels. Thus, each channel occupies an average approximately 5 MBPS. During the statistical multiplexing operation, the amount of compression for each channel, and correspondingly the amount of information transmitted for each channel, may be adjusted up or down depending upon the amount of available bandwidth for each transponder. The combiner 104 feeds back information to the A/D converters 102 during the statistical multiplexing operation to inform the A/D converters 102 of the amount of bandwidth used by various channels. Based on the information from the combiner 104, the A/D converters 102 then adjust the amount of compression of each signal.

The MPEG2 encoded digital data are output by the A/D converters 102 to the combiner 104. The combiner 104 groups the MPEG2 encoded digital data from each A/D converter 102 into a plurality of packets and marks each packet with a service channel identification (SCID) number or code. The SCIDs are later used by the receiver stations 88 to identify the packets corresponding to each television program. The combiner 104 combines all of the packets for all of the channels, adds error correction data, and outputs the output data stream 94 to the uplink dish 84.

The transmission station 82 processes audio signals in the same manner as it processes video signals, and the combiner 104 combines digital audio signals with the digital video signals. The combiner 104 also receives and processes electronic program guide data (as described below with respect to FIG. 3) and adds the electronic program guide data to the output data stream 94. The assembly and processing of the electronic program guide data prior to it being sent to the combiner 104 is described in greater detail below with respect to FIG. 3.

The output data stream 94, that is output by the combiner 104 is a multiplexed signal that is modulated by the combiner 104 using standard frequency and polarization modulation techniques. The output data stream 94 may include 16 frequency bands, with each frequency band being either left hand circular polarized or right hand circular polarized. Because there may be 32 transponders in some embodiments, each of the 16 frequency bands may be shared by two transponders. For example, transponder 1 may be assigned frequency 1, left hand circular polarization; transponder 2 may be assigned frequency 1, right hand circular polarization; transponder 3 may be assigned frequency 2, left hand circular polarization, etc.

Figure 3:
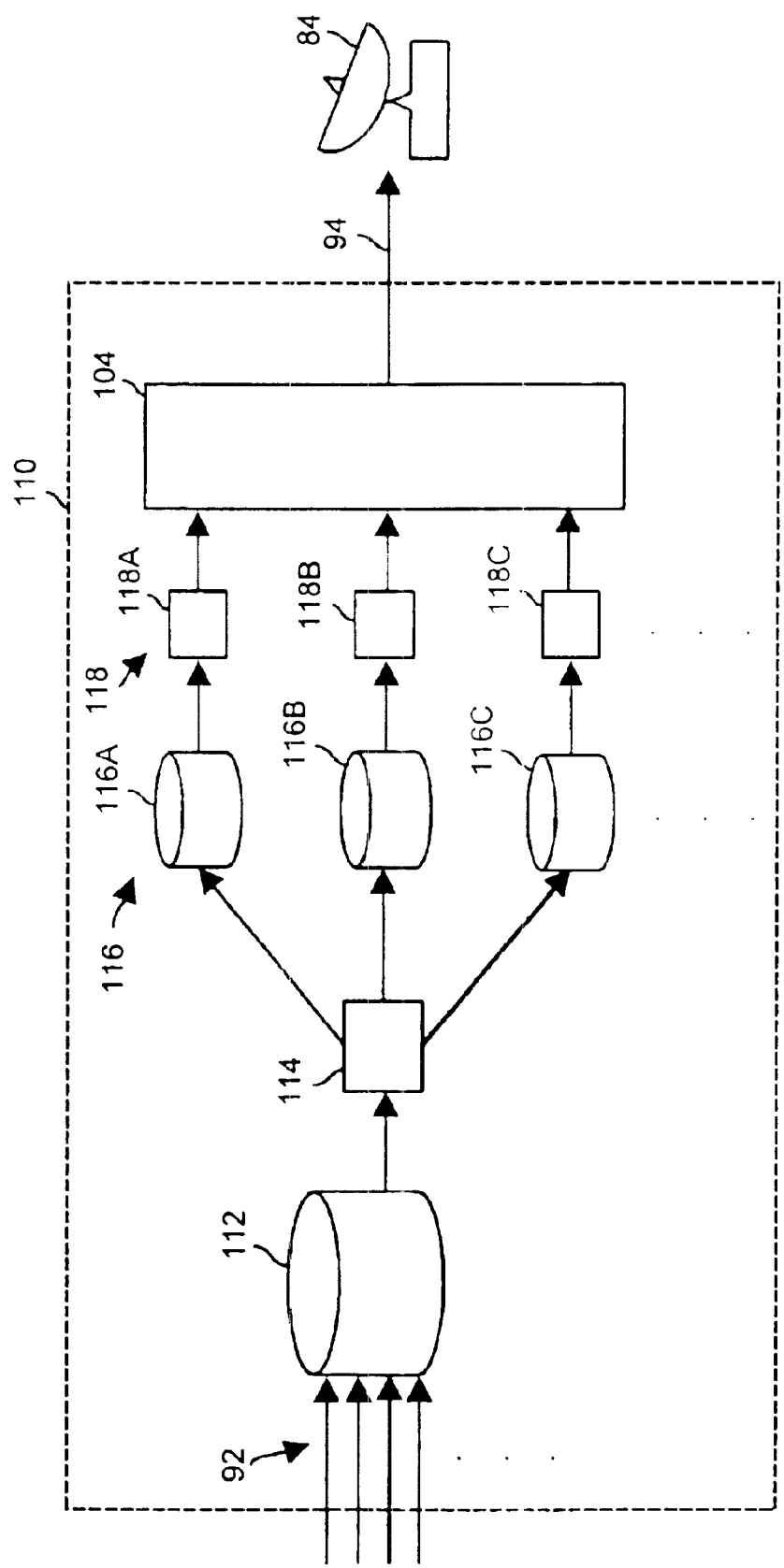
FIG. 3 illustrates a program guide data transmitting system that may be found in the transmission station of the system of FIG. 1.

As shown in FIG. 3, a program guide data transmitting system 110 that may be contained within the transmission station 82 may include a program guide database 112, a compiler 114, sub-databases 116A–116C (collectively referred to as sub-databases 116), cyclers 118A–118C (collectively referred to as cyclers 118) and the combiner 104. The schedule feeds 92 provide electronic schedule information about the timing and content of various television channels, such as that found in television schedules contained in newspapers and television guides. The schedule feeds 92 preferably include information from one or more companies that specialize in providing schedule information, such as GNS, Tribune Media Services and T.V. Data, and also typically include the manual entry of schedule data at the site of the program guide database 112. The data provided by companies such as GNS, Tribune Media Services and T.V. Data are typically transmitted over telephone lines to the program guide database 112. These companies provide television schedule data for all of the television stations across the nation plus the nationwide channels, such as Showtime, HBO, and the Disney Channel. The specific format of the data that are provided by these companies may vary from company to company.

The program guide database 112 may include schedule data for televisions channels across the entire nation including all nationwide channels and local channels, regardless of whether the channels are transmitted by the transmission station 82. The program guide database 112 may also include schedule data for radio stations across the nation. The ability to transmit nationwide program guide content is a difficult task due to the tremendous quantity of data and the need for the receiver stations 88 to quickly obtain the information they need upon being powered up.

The program guide database 112 may be a computer-based system that receives data from the schedule feeds 92 and organizes the data into program guide data having a standard format (e.g., a grid of cells). The compiler 114 reads the standard form program guide data out of the program guide database 112, identifies common schedule portions, converts the program guide data into the proper format for transmission to users (specifically, the program guide data may be converted into objects as discussed in Section II below) and outputs the program guide data to one or more of the subdatabases 116.

During the identification of common schedule portions, the compiler 114 examines the program guide data for each channel and identifies sets of program information that are the same for multiple channels. As will be discussed below, these identified sets of common program information are later transmitted a single time for the multiple channels containing the common program information, rather than transmitting the information individually for each channel.

After the compiler 114 converts the program guide data from the program guide database 112 into the proper object format, the compiler 114 outputs program guide objects to sub-databases 116. The program guide objects are temporarily stored in the sub-databases 116 until the cyclers 118 request the information. Each of the cyclers 118 preferably transmnits program guide objects to the combiner 104 at a different rate than the other cyclers 118. For example, the cycler 118A may transmit program guide objects to the combiner 104 every second, while the cyclers 118B and 118C may transmit program guide objects every 5 seconds and every 10 seconds, respectively.

Because the receiver stations 88 may not always be powered up and receiving and saving program guide objects, the program guide objects must be continuously retransmitted. Program guide objects for programs that will be shown in the next couple of hours are sent more frequently than program guide objects for programs that will be shown in 12 hours or more. Thus, the program guide objects for the most current programs are sent to a cycler 118 having a high rate of transmission, while program guide objects for later programs are sent to the cyclers 118 having a lower rate of transmission.

All of the program guide objects output by the plurality of cyclers 118 are combined by the combiner 104. The combiner 104 combines the program guide objects with the digital video and audio data output by the A/D converters 102 (shown in FIG. 2). The combiner 104 transmits the output data stream 94, which includes the program guide data and the digital video and audio data, to the uplink dish 84 for broadcast to the satellite 86.

II. Format of Transmitted Program Guide Data

Prior to transmitting the program guide data to the sub-databases 116, the compiler 114 organizes the program guide data from the program guide database 114 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by the compiler 114 into multiple frames. Each frame includes a plurality of 126 byte packets, a frame header, program guide data and a checksum. Each frame header includes the same information as the object header described above—object type, object ID and version number. The frame header uniquely identifies the frame, and its position within a group of frames that make up an object. The program guide data within frames are used by the receiver station 88 to construct and display a program guide on a user's television. The checksum is examined by receiver stations 88 to verify the accuracy of the data within received frames.

The system disclosed herein may use over 15 different object types. The following is a list of object types, although many additional or different object types may be used: boot object, channel list object, channel object, master schedule object, general schedule object, boot event object, general program object, conditional object, time object, deletion object, name system object and a reserved object.

A boot object identifies the SCIDs where all other objects may be found. A boot object is commonly transmitted on the same channel, which means that each packet of data that makes up a boot object is marked with the same SCID number. Boot objects are transmitted frequently to ensure that any receivers 82 that have been shut off, and are then turned back on, immediately receive information indicating the location of the various program guide objects. Thus, boot objects are sent from the compiler 114 to a cycler 118 with a high rate of transmission.

A channel list object contains a list of all the channel objects (discussed below) in a network. A network is a grouping of all channels from a common source, such as all channels provided by a direct broadcast system (DBS). For each channel object in the list of channel objects, the channel list object includes a channel object ID for that channel object. Each channel object is uniquely identified by its channel object ID.

Each channel object provides information about a particular channel. Each channel object points to a master schedule object (discussed below). Each channel object includes multiple fields or descriptors that provide information about that channel. Each descriptor includes a descriptor type ID that indicates the type of the descriptor. Descriptor types include "about" descriptors, "category" descriptors, "name" descriptors and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. The "name" descriptor associates a given text string to one or more name systems (discussed below). "Reserved" descriptors are saved for future improvements to the system.

A boot event object provides brief information about programs that are currently being broadcast or that will be broadcast in the near future (e.g., within the next two hours) on a particular channel. Thus, each boot event object is associated with one particular channel object, and is not shared among different channel objects. The information provided by the boot event object is not as complete as that provided by a general program object (discussed below). The function of the boot event object is to allow the receiver stations 88 to quickly acquire program information after the receiver stations 88 are powered up. The receiver stations 88 then continue to acquire complete program information in the background from general program objects. Because the purpose of boot event objects is to provide the receiver station 88 with immediate program information, boot event objects are transmitted by a cycler 118 having a high rate of transmission.

A general program object provides a complete description of a program, but does not include any starting time or duration for the program. The general program object is pointed to by other objects (namely, master schedule objects and general schedule objects, which are discussed below) that contain the starting time and duration of the program. Like channel objects, descriptors are used within program guide objects. General program objects use the same types of descriptors as channel objects. Category descriptors provide a category classification for the general program object containing that descriptor. Name descriptors include text and the text's association to one or more name systems (discussed below). If the compiler 114 determines that a particular program is scheduled to appear on multiple channels, the general program object for that channel is transmitted a single time for the multiple channels, although, as discussed above, it may be retransmitted multiple times.

A general schedule object points to a group of general program objects. A general schedule object is assigned a time duration by a master schedule object (discussed below). Each general schedule object identifies all of the general program objects that must be acquired for the assigned time duration. Each general schedule object is uniquely identified by a schedule object ID. A unique general schedule object may be pointed to by more than one master schedule object. As time progresses and the scheduling information becomes stale, the general schedule object is no longer needed. General schedule objects that are not referenced by any master schedule object are discarded by the receiver station 88.

A master schedule object contains the start time of the entire schedule, as well as the start time and duration of the general schedule objects and general program objects. A master schedule object points to general program objects and general schedule objects. The start time of the first general schedule object is given by the schedule start time. The start time of the next general schedule object is the time the previous general schedule object ends. As time progresses and the scheduling information becomes stale, a new master schedule object replaces the previous version, and updates the scheduling information. Thus, the channel object pointing to the master schedule object need not be updated. Only the master schedule object is updated.

A conditional object contains an object that is preceded by a conditional expression. If the expression is evaluated to "TRUE," the object within is valid and is processed accordingly. If the expression is evaluated to "FALSE," the object within is ignored.

A time object provides the current time of day and date at the transmission station 82. Time objects include format codes that indicate the part of the date and time is to be displayed. For example, the only part of the date of interest might be the year. Similarly, whenever dates and times are transmitted within an object, the dates and times are accompanied by format codes. The format codes instruct the receiver station 88 which portion of the transmitted date and time to display. The format codes may also instruct the receiver station 88 to display the time in "relative time", which is discussed below.

A deletion object provides a list of object IDs that the receiver station 88 must discard.

Reserved objects are saved for future improvements to the program guide system. When a new type of object is defined, all objects of that new type will include an object header with a reserved object type.

Of particular interest are name system objects that define name systems used in the receiver station 88. Each name system object is uniquely identified by a name system object ID. A name system is a data table having an entry ID# for each entry in the table. Name systems may be used for various purposes. For example, a name system may be used for program credits or other program information. An exemplary Credits Name System having an ID# equal to 1 may look like the following:

| Credits Name System (Object ID# 1) | |
|---|---|
| Entry | Entry ID# |
| "Actor" | 10 |
| "Director" | 11 |
| "Producer" | 12 |
| "Role" | 13 |

When actor names, director names, producer names and role information is processed by the receiver station 88, the receiver assigns Entry ID# 10, 11, 12 and 13 to those categories of information, respectively, in the Credits Name System, which is referred to as name system Object ID# 1.

Of course name systems other than the exemplary Credits Name system shown above may be used. For example, other name systems may include a Program Information Name System having entries that may include, for example, "Title," "Description" and "Year of Production," a Language Name System including the languages in which a program is available (e.g., "English," "Spanish," "French," etc.), and a Lengths Name System including the lengths of names of films, which may include entries of, for example, "Short," "Medium" and "Long." Additionally, other name systems maybe used for any set or sets of data that the receiver 88 uses frequently. Name systems reduce transmission bandwidth because data that is frequently used may be transmitted once, and referred to later by names or codes assigned in the name system table (i.e., Name System Object ID# and Entry ID#).

Figure 4:
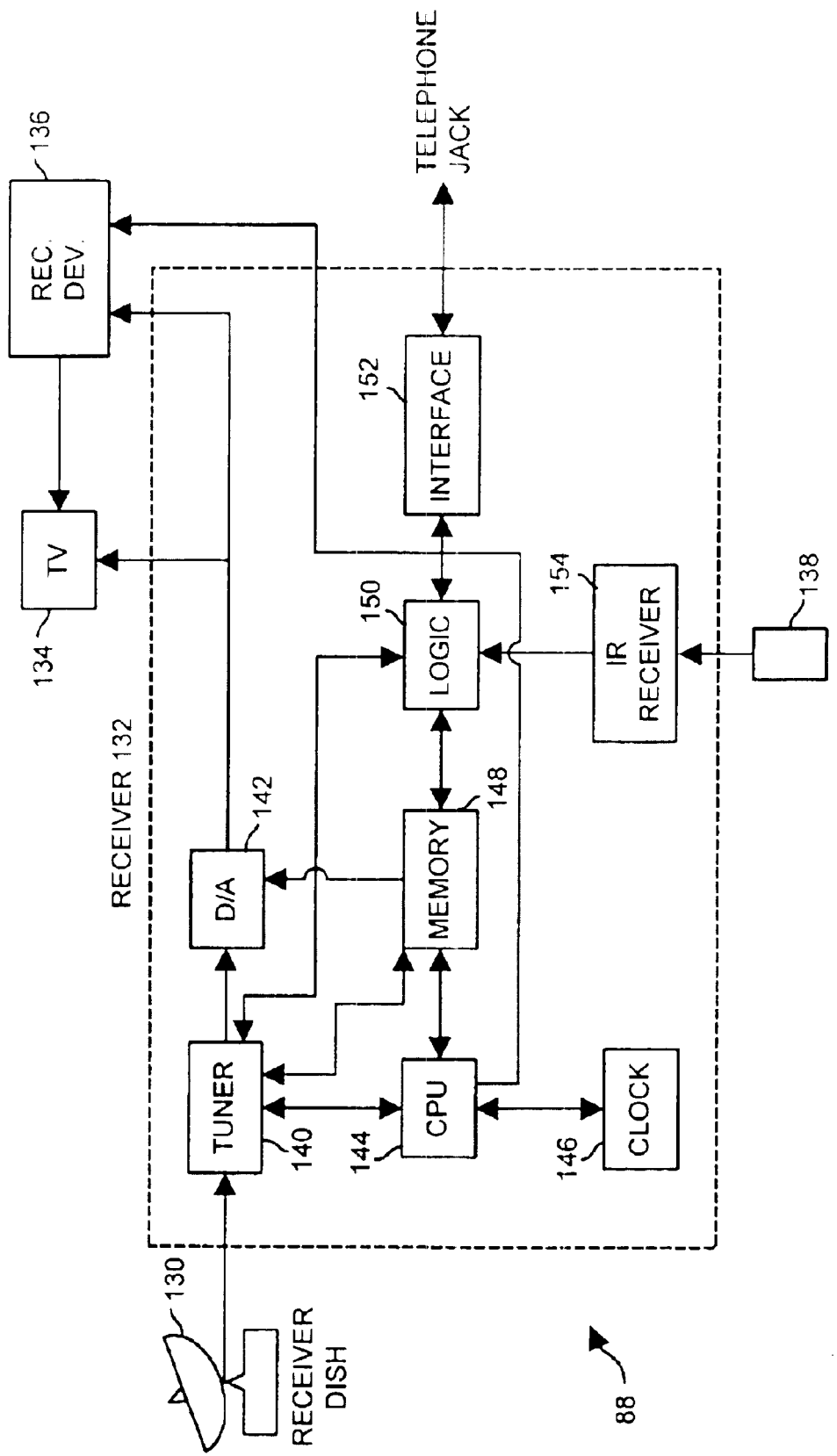
FIG. 4 illustrates further detail of the receiver station of FIG. 1.

When the receiver station 88 (the details of which are shown and described in connection with FIG. 4) receives a name system object, it creates and stores a corresponding name system table containing the information from the name system object. Each name system table includes a New System Object ID# and Entry ID#s that correspond to the IDs of the name system object that was used to create the table. Name system tables may be stored in a memory and may be updated by additional name system objects having additional entries for the table.

Many of the objects discussed above include text. Rather than transmitting blocks of text as free-form text, the disclosed system divides certain text blocks into individual data elements, and transmits each such data element as a name descriptor. Each name descriptor includes the data element to be transmitted and one or more linking instructions, which associate a data element with one or more name systems. The linking instructions for each data element include the Name System Object ID# and Entry ID# for each name system associated with the data element. Examples of data elements that may be transmitted as name descriptors include (1) a short program title in English, (2) a long program description in English, (3) an actor name, and (4) the year of production of a movie. The format of the transmitted name descriptors for each of these examples would preferably be the following:

(1) "Independence Day" [Name System Object ID# for "Lengths" name system, Entry ID# for "Short"] [Name System Object ID# for "Program Information" name system, Entry ID# for "Title"] [Name System Object ID# for "Languages" name system, Entry ID# for "English"]

(2) "Independence Day is a movie about . . . "[Name System Object ID# for "Lengths" name system, Entry ID# for "Long"] [Name System Object ID# for "Program Information" name system, Entry ID# for "Program Description"] [Name System Object ID# for "Languages" name system, Entry ID# for "English"]

(3) "Will Smith" [Name System Object ID# for "Credits" name system, Entry ID# for "Actor"]

(4) "1996" [Name System Object ID# for "Program Information" name system, Entry ID# for "Year of Production"]

Of particular interest is the fact that name system objects may include linking or matching instructions, which associate two or more entries within a name system. For example, the Credits Name System described above may include matching instructions to match the "Actor" entry with the "Role" entry to result in the following Credits Name System structure:

| Credits Name System (Object ID# 1) | | |
|---|---|---|
| Entry | Entry ID# | Linking Instructions |
| "Actor" | 10 | Use Credits Name System, Entry ID# 13 |
| "Director" | 11 | |
| "Producer" | 12 | |
| "Role" | 13 | |

For example, if the following two name descriptors are received:

(1) "Harrison Ford" [Name System Object ID# for "Credits" name system, Entry ID# for "Actor"]

(2) "Indiana Jones" [Name System Object ID# for "Credits" name system, Entry ID# for "Role"]

The receiver station 88 notes the matching instructions when the receiver station 88 accesses the Credits Name System table, and automatically matches the "Actor" and "Role-"data elements to display "Harrison Ford: Indiana Jones."

Linking instructions may also associate one or more entries between name systems, such as from a first name system with one or more entries from a second name system with one or more entries. For example, if an Entry ID# is 20 for a Title entry of a film in a Program Information Name System, an exemplary Credits Name System may relate the title of a film to an actor's name in an exemplary Credits Name System as follows:

| Credits Name System (ID# 1) | | |
|---|---|---|
| Entry | Entry ID# | Linking Instructions |
| "Actor" | 10 | Use Program Information Name System, Entry ID# 20 |
| "Director" | 11 | |
| "Producer" | 12 | |
| "Role" | 13 | |

For example, if the following two name descriptors are received:
(1) "Harrison Ford" [Name System Object ID# for "Credits" name system, Entry ID# for "Actor"]
(2) "Raiders of the Lost Ark" [Name System Object ID# for "Program Information" name system, Entry ID# for "Title"]

The receiver station 88 accesses the Credits Name System table, and automatically matches the "Actor" field from the Credits Name System and the "Title" field from the Program Information Name System and displays "Harrison Ford: Raiders of the Lost Ark."

Name system objects also may include default information that is used by the receiver station 88 to display an alternative version of a data element if the desired data element is not currently stored in the receiver station 88. For example, if the following Lengths Name System was stored in the receiver station 88:

| Lengths Name System (ID# 2) | | |
|---|---|---|
| Entry | Entry ID # | Default |
| "Long" | 10 | Use Lengths Name System, Entry ID# 11 |
| "Medium" | 11 | Use Lengths Name System, Entry ID# 12 |
| "Short" | 12 | |

For example, if the following name descriptor was stored in the receiver station 88:
"Indiana Jones and the Temple of Doom" [Name System Object ID# for "Program Information" name system, Entry ID# for "Title"] [Name System Object ID# for "Lengths" name system, Entry ID# for "Medium"]

When a user instructs the receiver station 88 to display the long version of the "Indiana Jones" title, but no such version exists in the receiver station 88, the receiver station 88 will see from the Lengths Name System table that, because there is no "Long" version available, it may display the "Medium" version that is stored in the receiver station 88. Similarly, if there were no "Medium" version, the receiver station 88 would know that it may use a "Short" version. In the case where it may not make sense to have more than one version of a data element (e.g., the title for the program "Taxi" would have only one version—a short one), only one version of the data element is transmitted and stored, and that version is automatically used when the receiver station 88 is looking for a short, medium or long version of the title.

Although the foregoing description of naming systems indicates that matching instructions may be sent from the transmission station 82 to the receiver stations 88, this disclosure further contemplates that distributed processing may be carried out at the receiver stations 88 to perform matching or linking to common data contained in the program guide data sent from the transmission station 82 to the receiver stations 88 without the use of matching instructions. In a distributed processing arrangement, each receiver station 88 may process information received from the transmission station 82 using (1) keywords or phrases from a keyword list, (2) automatic detection of common words in received information, (3) common data items or (4) category information in common between different programs to develop links between common data III. Receipt and Processing of Program Guide Data FIG. 4 is a block diagram of one of the receiver stations 88 that receives and decodes audio, video and data signals. The receiver station 88 includes a receiver dish 130, a receiver 132, a television 134, a recording device 136 and a remote control 138. The receiver 132 includes a tuner 140, a digital-to-analog (D/A) converter 142, a CPU 144, a clock 146, a memory 148, a logic circuit 150, an interface 152 and an infrared (IR) receiver 154.

The receiver dish 130 receives signals sent by the satellite 86, amplifies the signals and passes the signals on to the tuner 140, which operates under control of the CPU 144. The functions performed by the CPU 144 are controlled by a control program stored in the memory 148. The memory 148 also stores a parameter table that may include a variety of parameters for the receiver 132 such as a list of channels the receiver 132 is authorized to process and generate displays for, the zip code for the area in which the receiver 132 is used, and the model number of the receiver 132. Additionally, the memory 148 may also store a keyword list, a list of common data items or a linked list, all of which may be used to automatically generate links or linking information for use in an EPG. The clock 146 provides the current local time to the CPU 144. The interface 152 may be coupled to a telephone jack at the site of the receiver station 88 and may allow the receiver 132 to communicate with the transmission station 82, via telephone lines.

The signals sent from the receiver dish 130 to the tuner 140 are digital signals that are grouped into a plurality of packets. Each packet includes a header that identifies the SCID number for the packet, and the type of data contained in the packet (e.g, audio data, video data, or program guide data). The tuner 140 includes multiple output lines for transmitting video data, audio data, and program guide data. As packets are received from the receiver dish 130, the tuner 140 identifies the type of each packet and outputs each packet on the appropriate output line. If the tuner 140 identifies a packet as program guide data, the tuner 140 outputs the packet to the memory 148. Program guide data is stored in a guide database in the memory 148.

Users select a particular channel to watch on the television 134 using the remote control 138, which emits infrared signals that are received by the infrared (IR) receiver 154 of the receiver 132. Other types of data entry devices may be alternatively be used, such as an ultra-high frequency (UHF) remote control, a keypad on the receiver 132, a remote keyboard (not shown) and a remote mouse (not shown). When a user selects a channel using the remote control 138, the IR receiver 154 relays the user's selection to the logic circuit 150, which then passes the selection on to the memory 148 where the selection is accessed by the CPU 144, which instructs the tuner 146 to output the audio and video packets for the selected channel to the D/A converter 142. The D/A converter 142 performs an MPEG2 decoding step on received packets, converts the packets to analog signals, and outputs the analog signals to the television 134.

Initially, as data enters the receiver 132, the tuner 140 looks for a boot object. Boot objects are always transmitted with the same SCID, so the tuner 140 knows that it must look for packets marked with that SCID. A boot object identifies the SCIDs where all other program guide objects can be found. The information from the boot object is used by the tuner 140 to identify packets of program guide data and route them to the memory 148.

As program guide data is received and stored in the guide database in the memory 148, the CPU 144 performs various operations on the data in preparation for displaying a program guide on the television 134. These operations include packet assembly, object assembly and object processing.

The first operation performed on the program guide data stored in the guide database in the memory 148 is packet assembly. During the packet assembly operation, the CPU 144 examines the stored program guide data and determines the locations of the packet boundaries.

The next step performed by the CPU 144 is object assembly. During the object assembly step, the CPU 144 combines packets to create object frames, and then combines the object frames to create program guide objects. The CPU 144 examines the checksum transmitted within each object frame, and verifies whether the frame data was accurately received. If the object frame was not accurately received, it is discarded from the memory 148. Also during the object assembly step, the receiver 132 discards assembled objects that are of an object type that the receiver 132 does not recognize. The receiver 132 maintains a list of known object types in the memory 148. The CPU 144 examines the object header of each received object to determine the object type and compares the object type of each received object to the list of known object types stored in the memory 148. If the object type of an object is not found in the list of known object types, the object is discarded from the memory 148. Similarly, the receiver 132 maintains a list of known descriptor types in the memory 148, and discards any received descriptors that are of a type not in the list of known descriptor types.

Future enhancements to the system disclosed herein may be made using the reserved object types and reserved descriptor types. As new types of objects are defined, each object of the new object type includes a reserved object type in the object header. The reserved object type is added to the list of known object types in new receivers. When new objects types are defined, new functions are added to the control program that controls the CPU 144. The CPU 144 executes the new functions when an object of the new object type is received. The addition of new object types does not affect the operation of older receivers. Older receivers recognize that the new object types are reserved object types that are not included in the list of known object types, and the older receivers simply discard those objects. Similarly, new descriptor types may be added into the system and used by new receivers while not affecting the operation of older receivers.

The last step performed by the CPU 144 on received program guide data is object processing. During the object processing step, the objects stored in the guide database are combined to create a digital image of a program guide. The digital image of the program guide is later converted to an analog signal that is sent to the television 134 for display to a user.

The receiver 132 acquires and stores program guide objects in three stages: bootup stage, building database stage and maintenance stage. The bootup stage occurs during power up of the receiver 132 when the guide database is empty. During the bootup stage, the receiver 132 mainly receives and stores boot event objects, which are transmitted more frequently than other program guide objects. During the building database stage, the receiver 132 continues to acquire program guide objects to complete the program guide. Specifically, the receiver 132 begins receiving more and more general program objects which provide more information than the boot event objects, but are sent less frequently. As general program guide objects are received, they replace the boot event objects, and the boot event objects are discarded from the guide database. During the maintenance stage, the receiver 132 adds new or updated program guide objects to the guide database, and discards old versions of program guide objects. The building database and maintenance stages occur simultaneously.

Initially, during the bootup stage, the CPU 144 constructs the program guide digital image from boot event objects. Each boot event object provides brief information about programs that are currently being broadcast or that will be broadcast in the near future (e.g., within the next two hours) on a particular channel. As general program objects and general schedule objects are received, the CPU 144 replaces information from the boot event objects, with the information from the general program objects and general schedule objects.

Each general program object provides a complete description of a program. Each general schedule object points to a group of general program objects. Prior to using general program objects and general schedule objects, receiver 82 must receive a master schedule object, which contains timing information.

A master schedule object contains the start time of the entire schedule, as well as the start time and duration of the general schedule objects and general program objects for the plurality of channels with channel objects that point to the master schedule object. A master schedule object is like a program guide template with a grid of empty cells, and pointers to general program objects and general schedule objects that are required to fill the empty cells. Each master schedule object essentially includes a row of empty cells for each of the channels that have channel objects pointing to the master schedule object. The CPU 144 inserts information from the objects that are pointed to by the master schedule object into the digital image of the program guide in locations defined by the timing information in the master schedule object. As time progresses and the scheduling information becomes stale, a new master schedule object replaces the previous version, and updates the scheduling information.

Some master schedule objects will point to a single program object or a single general schedule object to fill multiple cells for multiple channels. Using the same object to fill multiple cells for multiple channels conserves transmission bandwidth, as multiple versions of the objects need not be transmitted.

During the maintenance stage of object acquisition, new versions of objects are received and the receiver 132 discards the old versions. General program objects and general schedule objects are typically discarded if they are not pointed to by a master schedule object. In addition, the receiver 132 occasionally receives deletion objects which provide a list of object IDs that the receiver 132 is to discard or delete from the memory 148.

When a name system object is received and stored in the memory 148, the CPU 144 automatically creates a corresponding name system table in the memory 148. Each name system table includes a table ID# and table Entry ID#s that correspond to the ID#s of the name system object that was used to create the table. The CPU 144 automatically updates a name system table when the CPU 144 receives a new version of a name system object that was used to create a new system table.

As discussed above, each name descriptor within a program guide object includes a data element and one or more linking instructions that provide an association between the data element and one or more name systems. The CPU 144 performs any instructions that associate two or more entries within the name system. The linking instructions for a particular data element include the name system object ID# and the entry ID# for each name system associated with the data element. When the receiver 132 receives objects having name descriptors, the CPU 144 stores the name descriptors in the memory 148 in a name descriptor database.

IV. Program Guide Features

Figure 5:
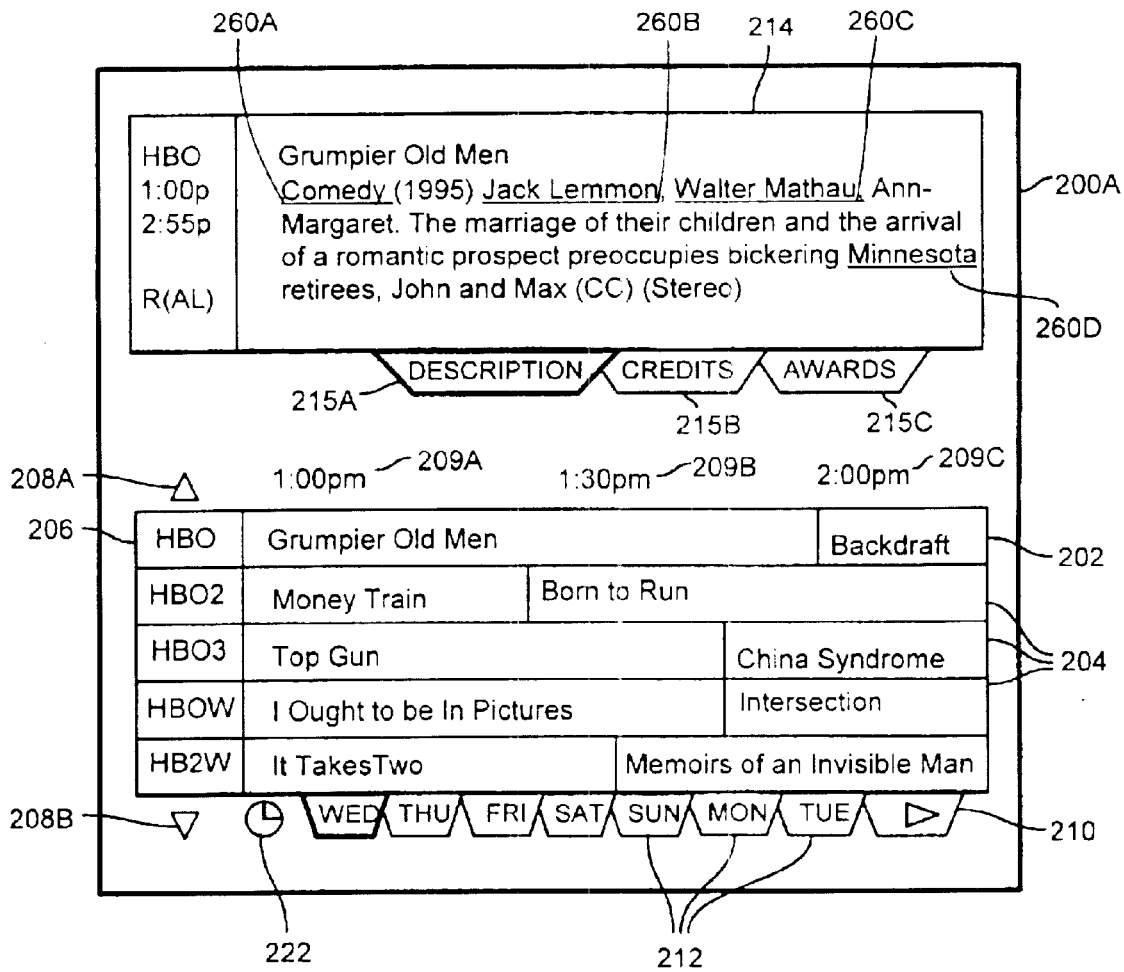
FIG. 5 illustrates an electronic television program guide that may be provided by the system of FIG. 1.

FIG. 5 is a diagram of an electronic television program guide 200A that may be displayed on a television or on other types of display devices, such as on a liquid crystal display (LCD) panel and provides information about the timing and content of various television programs. The transmission and receipt of program guide data that are used to generate program guide displays, such as the program guide 200A were discussed above with respect to FIGS. 1–4.

The program guide 200A includes a grid 202, cells 204, a channel list 206, scroll buttons 208A and 208B, time indicators 209A–209C (collectively referred to as time indicators 209), a jump button 210, day indicators 212, an information window 214, and category buttons 215A, 215B and 215C (collectively referred to as category buttons 215). The various buttons and cells may be highlighted as a user navigates the program guide 200A using the remote control 138 (shown in detail in FIG. 6).

The grid 202 consists of a plurality of cells 204, each of which may include a program title, and may provide additional information about the program. The channel list 206 includes a list of channel names or channel numbers, or both. The channel list 206 may also include icons, such as icons that represent particular channels. As will be explained in detail below, the cells 204 and entries within the channel list 206 may be color coded or symbol coded under user control, to indicate particular types of programming (e.g., news, movies, sports, etc.). Time indicators 209 indicate start and end times of the various programs displayed in the grid 202. Although half-hour time blocks (a time block is the length of time between two time indicators 209) are shown in the program guide 200A, other time block lengths may be used. The scroll buttons 208A and 208B allow users to scroll up and down within the channel list 206 to display different channels. The day indicators 212 indicate the day for which program information is presently being displayed. In FIG. 5, the day indicators 212 indicate that the displayed guide information is for Wednesday. The jump button 210 allows users to skip to program information for a different day than that presently displayed. A time button 222 allows users to skip to program information for a different time than that presently displayed.

The information window 214 provides additional information about programs displayed in the grid 202. The type of information displayed in the information window 214 depends on which category button 215A–215C is currently selected. Users select one of the category buttons 215A–215C using the remote control 138. As shown in FIG. 5, the "Description" category is selected. Therefore, when a particular program is selected from the grid 202 by the remote control 138, a description of that program is displayed in the information window 214. In FIG. 5, the program "Grumpier Old Men" was selected from the grid 202, so a description of that program is displayed in the information window 214. Similarly, if the category buttons 215A or 215C were selected, credits information or awards information, respectively, for "Grumpier Old Men" would be displayed in the information window 214. Other types of category buttons 215 may also be used to display additional categories of information.

Figure 6:
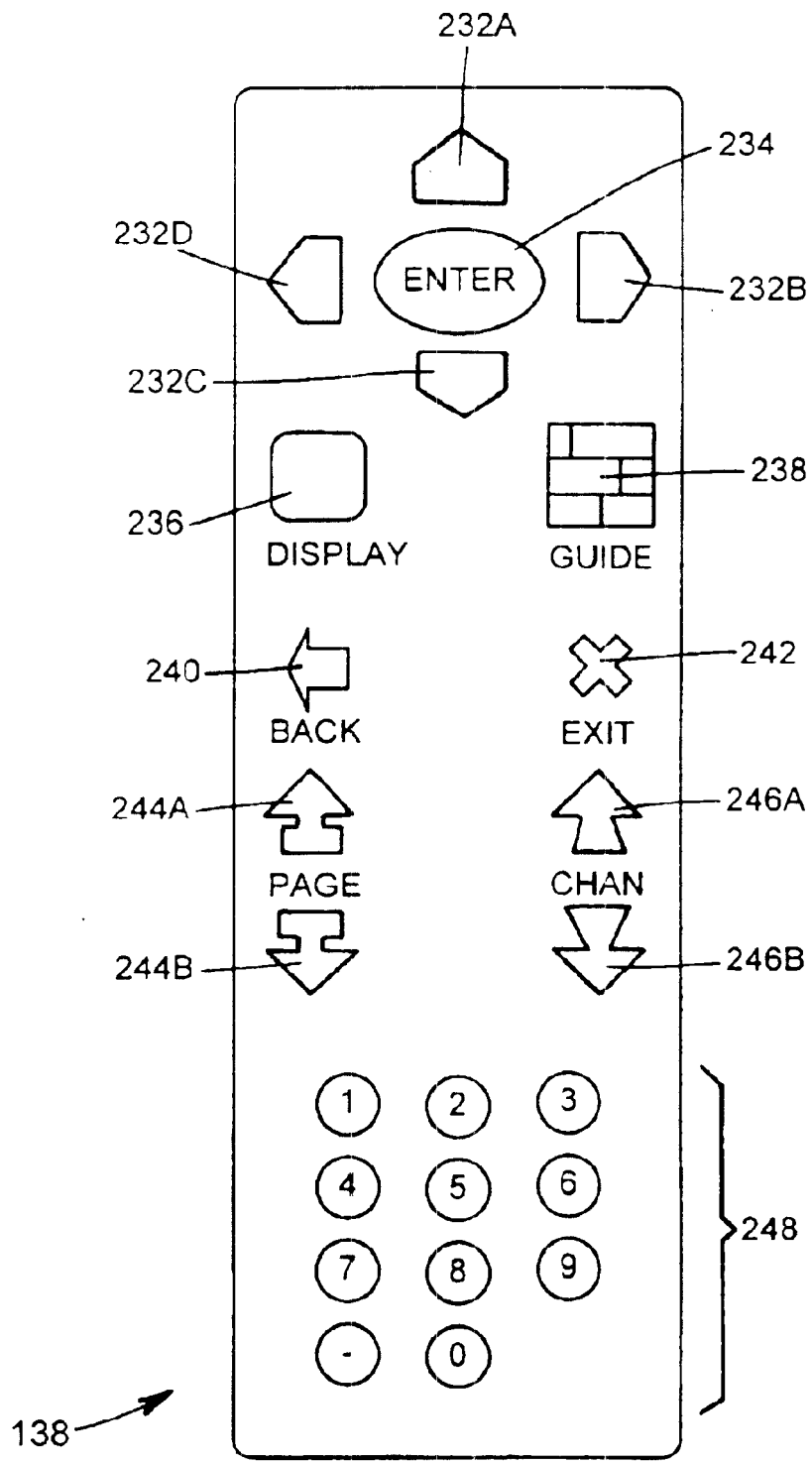
FIG. 6 illustrates a remote control that may be used to control the electronic television program guide of FIG. 5.

As shown in FIG. 6, the remote control 138 includes four navigation buttons or keys 232A–232D, an enter button 234, a display button 236, a guide button 238, a back button 240, an exit button 242, a page up button 244A, a page down button 244B, a channel up button 246A, a channel down button 246B and numeric buttons 248. Additional buttons may also be used in remote control 138.

The navigation buttons 232A–232D allow users to highlight various portions of program guide 200A by moving a highlight bar around selectable portions of the program guide (e.g., category buttons 215, grid 202, underlined items in information window 214 and channel list 206). Other well-known techniques may alternatively be used to highlight selectable portions of the program guide 200A, such as changing the text of the highlighted portion to italics or bold. When the desired portion of the program guide 200A is highlighted, the user may press the enter button 234 to select the highlighted portion. For example, if the program "Top Gun" were highlighted in the grid 202 of the program guide 200A, and a user pressed the enter button 234, a description of "Top Gun" would be displayed in the information window 214. Alternatively, program descriptions could be displayed in the information window 214 automatically, without pressing the enter button 234, as various programs in the grid 202 are highlighted during the navigation process.

When the guide button 238 is pressed while a user is watching a television program, the program guide 200A is displayed on the television screen. The program guide 200A may be displayed on its own, or it can overlay the channel currently being viewed.

As will be described below, users may make various selections from the program guide 200A which will result in the showing of a hierarchy of menus or other screens. The back button 240 allows users to jump to previously displayed menus in a hierarchy of menus, or to a previously displayed screen. When the exit button 242 is pressed, the program guide 200A is removed from the television screen, and the previously shown program is displayed.

Users may page through the program information in the grid 202 a page at a time using the page up button 244A and the page down button 244B. The channel buttons 246A and 246B allow users to change television channels. The numeric buttons 248 allow users to enter television channels and other numeric information.

V. Display of Program Guide Data

When a user requests display of a program guide 200 by pressing the guide button 238 on remote control 138, a guide request signal is received by IR receiver 154 (shown in FIG. 4) and transmitted to the logic circuit 150. The logic circuit 150 informs the CPU 144 of the guide request. In response to the guide request, the CPU 144 causes the memory 148 to transfer the program guide digital image to the D/A converter 142. The D/A converter 142 converts the program guide digital image into a standard analog television signal, which is then transmitted to the television 134. The television 134 then displays program guide 200.

In addition to generating a program guide 200 that includes standard schedule information like program titles, descriptions and times (as shown in FIG. 5), the receiver 132 performs additional functions that facilitate the effective use of program guide data. These functions include: (1) the use of name systems in searching for information, formatting the display of information and conservation of memory, (2) the use of keyword tables to provide links to related information and to provide an entry completion function, (3) the display of time in descriptive relative phrases (e.g., tomorrow at 10:00 am.), and (4) user control over program guide content.

A. Receiver Use of Keyword Tables

As program guide objects are received and stored in the memory 148, the CPU 144 monitors the program guide objects and creates keyword indexes or tables in the memory 148. The keyword tables link program guide objects to the keywords and may include a list of keywords and, for each keyword, a list of program guide objects that contain that keyword. Examples of keywords may include, but are not limited to, actor names, director names and movie categories. For example, if Jack Lemmon is an entry in the keyword table and the CPU 144 sees objects listing Jack Lemmon, those objects containing Jack Lemmon are added to a list of program guide objects containing Jack Lemmon. Other keywords may include director names, program categories (e.g., comedy, drama, etc), geographic locations and the like. When a program guide 200 is displayed on the television 134, words contained in the keyword table are displayed along with an associated indicator 260, such as the underlining shown in FIGS. 5 and 7. Other types of indicators 260 may be used to signify keywords, such as italics, boldface type, or an icon. Indicators 260 inform users that additional information is available about the associated keyword.

Prior to instructing the memory 148 to transfer the digital image of a program guide to the D/A converter 142, the CPU 144 adds indicators 260 to any words in the digital image of the program guide that appear in the keyword table. The CPU 144 also monitors the status of the entries in the keyword table. When the CPU 144 detects that an entry is no longer current (e.g., the programs containing the keyword no longer appear in the program guide), the CPU 144 removes the entry from the keyword table.

Users may select any of the displayed keywords using remote the control 138 to link to information associated with the keywords. Users navigate around the program guide 200 using navigation buttons 232. When the desired keyword is highlighted, a user presses enter key 234 on remote control 220 to select that keyword.

Figure 7:
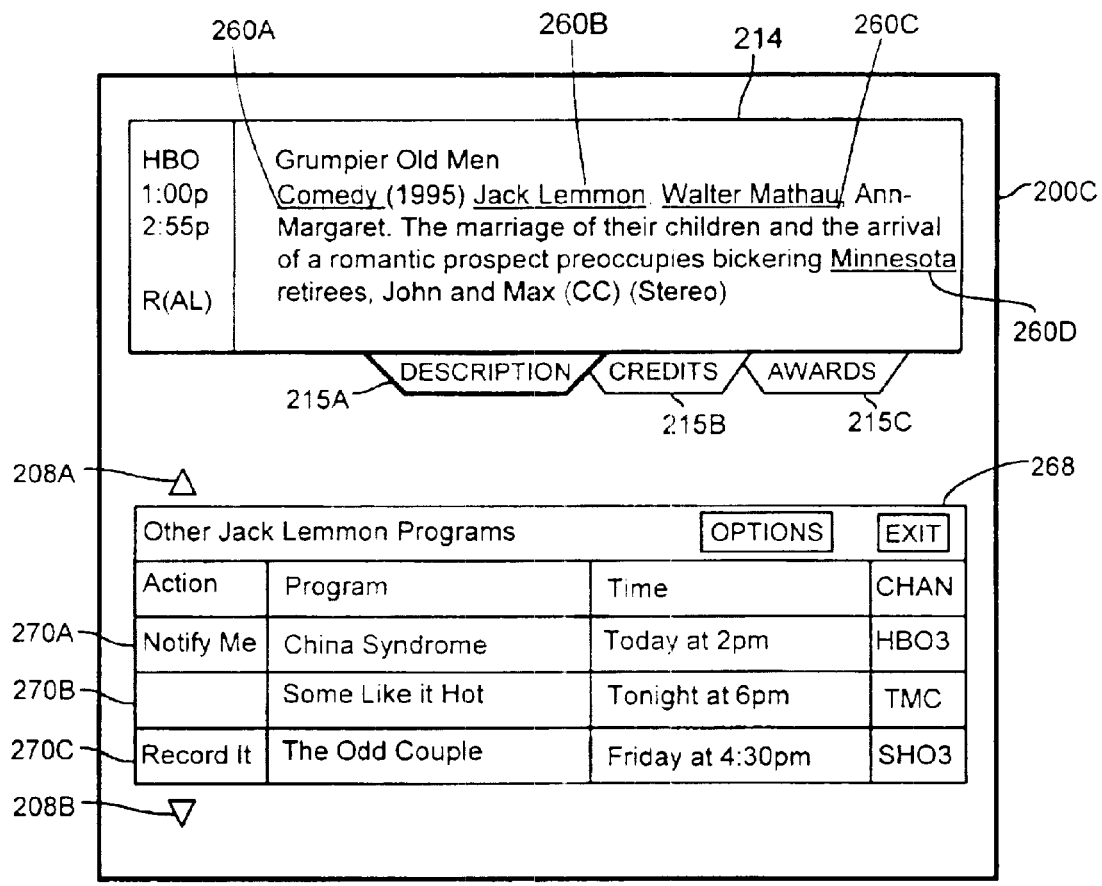
FIG. 7 illustrates an electronic television program guide showing a keyword window.

For example, in FIG. 7, the keyword "Jack Lemmon" has been selected. When a keyword has been selected, a keyword window 268 is displayed. The keyword window 268 provides additional information about the selected keyword. As shown in FIG. 7, additional information may include other Jack Lemmon movies. The keyword window 268 may include a plurality of entries 270A–270C (collectively referred to as entries 270). Users can enter a desired action for any of the entries 270 in the keyword window 216 using the remote control 220. Desired actions may include, for example, user notification of the broadcast of a particular program or automatic recording of a particular program. If a user selects notification for a particular entry 270, the receiver 132 will display a notification to a user on the television 134 prior (e.g., 5 minutes) to the start of the desired program. In FIG. 7, entry 270A is shown as selected for notification. If a user selects automatic recording for an entry, the receiver 132 will instruct the recording device 136 to begin recording the desired program at the start of the program and to end recording when the broadcast of the desired program has completed. In FIG. 7, entry 270C is shown as selected for automatic recording.

In addition to actor names, keywords may be a category of programming (e.g., comedy). For example, if comedy were an entry in the keyword list, any program guide objects containing the word comedy would be added to the list of comedy guide objects. If the keyword "Comedy" were selected from program guide 200C shown in FIG. 7, the receiver 132 would display additional comedy programs in the keyword window 268. The receiver 132 identifies comedy programs to display by examining the category descriptors of the general program objects stored in the memory 148, and identifying those program objects that include a "Comedy" category descriptor.

The list of keywords in the keyword table may be drawn from one or any combination of the following sources: (1) keywords stored in the receiver 132 by the receiver manufacturer, (2) transmitting keywords as a table or group similar to a name system object, (3) transmitting keywords individually with other program guide data with the keywords explicitly marked so that the receiver 132 may separate the keywords from non-keyword data (e.g., using a keyword descriptor within a program guide object), (4) deriving keywords by having the receiver 132 correlate received program guide data with itself, and identifying words that appear two or more times (the list of keywords obtained by this method is filtered to remove common terms such as "the" that appear frequently but do not contribute to useful indexing), and (5) transmitting program guide data marked with additional information for purposes other than keyword tables, such as marking data elements with a category identifier for searching purposes, and then using these markings to identify keywords. No matter how the keyword table is created, the concept is that each guide object containing a keyword is linked to that or those particulars keyword(s).

In addition to assisting users in finding related information, the keyword tables may also be used to reduce user input of textual information, or otherwise facilitate the entry of valid data. The receiver 132 uses keyword tables to facilitate the entry of valid data by: (1) Indicating when an invalid entry has been made (2) providing a list of possible valued, and (3) "Filling in" a partially entered string.

In remote-controlled systems such as the present invention, users typically enter text by selecting letters from an alphabet or keyboard displayed on the television. Infrared remote keyboards may also be used to enter text. In the present invention, entry of text will be described with respect to a keyboard displayed in the information window 214 of the program guide 200. To enter a word, the navigation keys 232 of the remote control 220 are used to navigate around the displayed keyboard and highlight keys on the keyboard, and the enter key 234 is pressed to select a highlighted key.

Text entry is often needed when a user wants to search for a particular program, actor, director, etc., on the program guide. In the present invention, searching is accomplished by selecting a catagory button 215E ("Find"), shown in FIG. 9. When the category button 215E is pressed, a list of searching options is displayed in the information window 214. To perform an interactive search, a user scrolls down the list of options in the information window 214, and selects "Interactive search . . . " When "Interactive search . . . " is selected, a keyboard is displayed in the information window 214 and the user is prompted to enter a text string, and, if desired, to select a search category from a list of categories (e.g., Program Search, Actor Search, Director Search, etc.). If no category is selected, all categories of information are searched. To search for a particular actor, the user would select "Actor Search" from the list of search categories, and then begin entering the actor's name using the displayed keyboard. At any time during the entry of text, the user may choose to press the display key 236 on the remote control 220. When the display key 236 is pressed, the receiver 132 compares the entered text to the entries in the keyword table and displays a list of entries that include text that matches the entered text. The user can either scroll through the list of entries and select the desired entry, or continue to enter text, in which case the number of listed entries would continue to decrease as more text is entered.

As a more detailed example, if a user wishes to enter the text "forty-two", and begins by entering the letter "f" and pressing the display key 236, the receiver 132 would examine the keyword table and generate a list of possible matches such as:

five fifty four forty-one forty-two

The user can scroll through this list and choose "forty-two". If the user continues to enter text, and next enters a character other than "i" or "o", the receiver 132 would not match the entered text string with any of the keyword table entries. In such a situation, where the receiver 132 does not find a match, the receiver 132 provides immediate feedback to the user, indicating an invalid entry or that there are no matching entries. If the user had entered an "o" for the second character, the receiver would highlight "four", "forty-one" or "forty-two" and eliminate the other two entries. The elimination process continues as more text is entered.

B. Receiver Use of Name Systems

The CPU 144 uses name systems to search for particular types of data elements (e.g. all Spanish movie titles), to aid in the display of data elements, and to conserve the amount of memory used by the receiver 132. The use of name systems to perform these functions is discussed below with respect to FIGS. 8–9.

Figure 8:
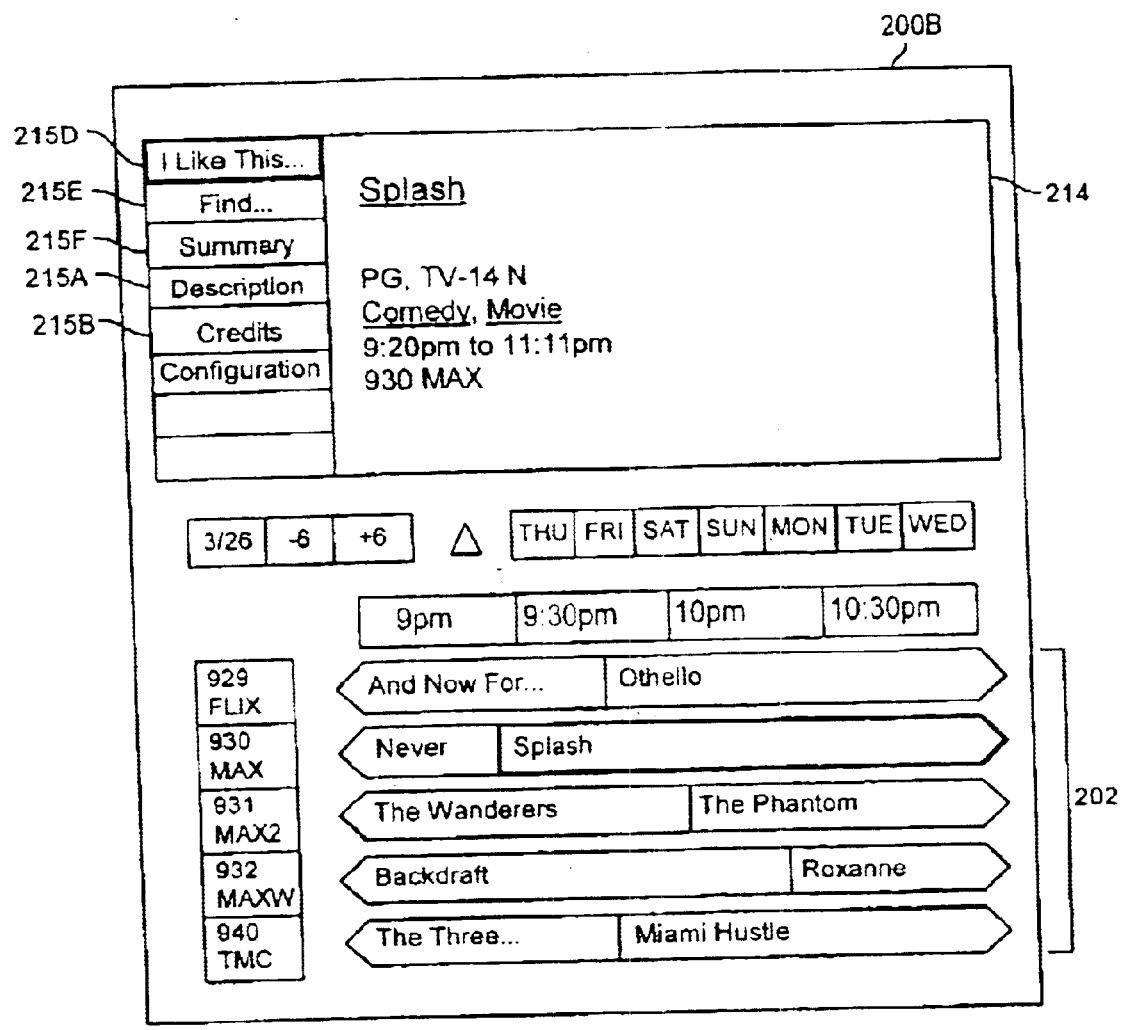
FIG. 8 illustrates an electronic television program guide having category buttons.

FIG. 8 shows an electronic television program guide 200B, which is generally similar to the electronic television program guide 200B shown in FIG. 5, but includes some additional category buttons 215 as well as other differences. Users can scroll up and down the plurality of category buttons 215 using remote control 220. As discussed above, the category buttons 215 allow a user to control the type of information displayed in the information window 214. The category buttons 215A and 215B operate as described above with respect to FIG. 5. In FIG. 8, a category button 215D ("I Like This . . .") has been selected. When a user selects the category button 215D, additional information about the program currently highlighted in grid 202 is shown in information window 214. As shown in FIG. 8, some of the additional information is underlined, which indicates that related information about the underlined word or words is available. The use of underlining to indicate related information is described in more detail below. A Category button 215F ("Summary") operates similarly to the category button 215A ("Description"), but less detailed information is displayed for category button 215F than that displayed for the category button 215A. The category button 215E ("Find") allows users to search for information. When a user selects the category button 215E, a list of search options is shown in the information window 214.

Figure 9:
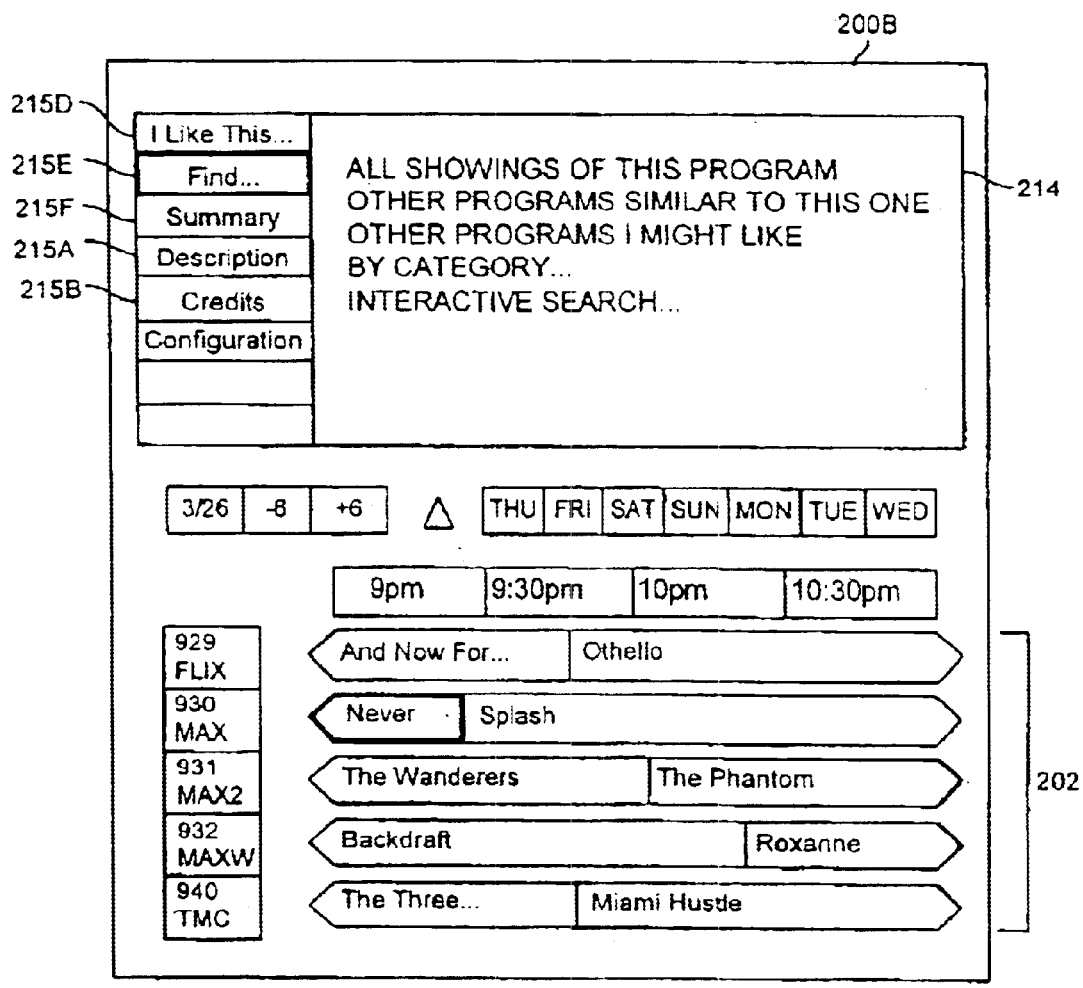
FIG. 9 illustrates an electronic television program guide showing various searching options.

FIG. 9 shows a list of search options in information window 214, which are displayed when a user selects the category button 215E ("Find"). A user may scroll through the list of search options using the remote control 220. Selecting the first option ("All showings of this program") causes the receiver 132 to display in the information window 214 the dates and times of all showings of the program currently highlighted in the grid 202. The receiver 132 locates the dates and times of all showings by examining the most current version of the master schedule object and locating all occurrence of the general program object for the highlighted program.

Selecting the second option ("Other programs similar to this one") from the information window 214 will cause the receiver 132 to display in the information window 214 a list of programs that are similar to the program currently highlighted in the grid 202. The receiver 132 preferably identifies the similar programs by examining category descriptors in all of the general program objects stored in the memory 148, and identifying those program objects that have the same category descriptor as the program object for the program highlighted in the grid 202.

Selecting the third option ("Other programs I might like") will cause the receiver 132 to display in information the window 214 a list of programs that might be of interest to the user. The receiver 132 preferably maintains a list of past user program choices in the memory 148, and the category descriptors for each of the past choices. When a user requests a display of other programs the user might like, the receiver 132 reviews the list of past choices and identifies the category of program that the user has most frequently chosen. The receiver 132 then displays in the information window 214 a list of programs that fall under the identified category.

Selecting the fourth option ("By category . . .") will cause the receiver 132 to display in the information window 214 a list of categories. The user can then scroll through the list of categories and select a desired category. When a user selects a desired category, the receiver 132 displays a list of programs in the information window 214 that fall under the selected category. The receiver 132 preferably selects the programs to display by examining category descriptors in all of the general program objects stored in the memory 148, and identifying those program objects that are of the same category as that selected by a user.

Selecting the fifth option in the information window 214 ("Interactive search . . .") causes the receiver 132 to display a keyboard in the information window 214. Users can scroll around the keyboard and enter text. After the desired text has been entered, the receiver 132 displays in the information window 214 a list of programs that contain text that matches the text entered by the user. The receiver 132 selects the list of programs to display by comparing the entered text to the entries in the descriptor database and name system tables stored in the memory 148.

When the receiver 132 displays a data element, it can use the data element's associated name space information to format the display of the data element. For example, if the name descriptor for a data element is:

"Stanley Kubrick" [Name System Object ID# for "Program Information" name system, Entry ID# for "Director"]the receiver 132 links the data element to its associated name system table entry and displays "Director Stanley Kubrick."

Name systems may also conserve memory in the receiver 132 by discarding name system entries that are inconsistent with a user's configuration of the receiver 132. As is discussed below, the receiver 132 allows users control over the content of the displayed program guide. As just one example, users can select the length of the program title entries that appear in the grid 202 (e.g., short, medium or long). This user-entered configuration information is stored in a configuration file in the memory 148. If a user chooses to display only short titles, the receiver 132 will discard all name descriptors that include medium and long titles. Similarly, if a user has selected that all information displayed in the program guide 200 be displayed in English, all name descriptors that are not in English are discarded. Thus, before a name descriptor is stored in the name descriptor database, all of its name system entries are compared to the configuration file. If any one of the name system entries is not selected in the configuration file, the name descriptor is discarded. If all of name system entries are selected in the configuration file, the name descriptor is retained and stored in the name descriptor database. In this way, name systems are used to exercise control over memory usage.

Although the present invention has been described with reference to preferred embodiments, workers skilled in the art will recognize that changes may be made in form and detail without departing from the spirit and scope of the invention.

What is claimed is:

1. A system for transmitting, receiving and displaying program guide data on a display screen, the system comprising:
  a program guide database storing program guide data having a plurality of segments, each segment of the plurality of segments associated with a program, some segments of the plurality of segments having a keyword therein;
  a transmitter communicatively coupled to the program guide database, the transmitter adapted to receive program guide data from the program guide database and to transmit to program guide data over a broadcast channel;
  a tuner tuned to the broadcast channel, the tuner adapted to receive the program guide data from the broadcast channel;
  a memory storing a keyword table having the keyword therein; and
  a processor coupled to the tuner and the memory, the processor programmed to populate the keyword table with words by examining the program guide objects as they are received by the tuner and entering into the keyword table words that appear in the program guide objects more than a particular number of times, to compare each segment of the program guide data to the keyword table to determine which segments of the plurality of segments have the keyword therein, to link to the keyword to programs associated with the segments having the keyword therein and to display the keyword on the display screen.

2. The system of claim 1, wherein each program has an associated name and wherein the processor in further programmed to display on the display screen a list of names of programs associated with the segments having the keyword therein, when the keyword is selected on the display screen.

3. The system of claim 2, wherein the processor is further programmed to display on the display screen a program associates with a name from the list of names of programs when the name of that program is selected from the list of names of programs.

4. The system of claim 2, wherein each program has associated program information and wherein the processor is further programmed to display program information associated with a program when the name of the program is selected from the list of names of programs.

5. The system of claim 2, wherein the processor is further programmed to display the keyword in a highlighted fashion.

6. The system of claim 1, wherein the keyword comprises a name of an actor in a program.

7. The system of claim 1, wherein the keyword comprises a name of a director of a program.

8. The system of claim 1, wherein the keyword comprises a name of a director of a program.

9. The system of claim 1, wherein the keyword table is stored in a memory by information sent of over the broadcast channel.

10. A receiver for use with a transmitter transmitting program guide data over a broadcast channel, the program guide data having a plurality of segments, each segment of the plurality of segments associated with a program, some segments of the plurality of segments having a keyword therein, the receiver comprising:
  a tuner tuned to the broadcast channel, the tuner receiving the program guide data from the broadcast channel;
  a memory storing a keyword table having the keyword therein; and
  a processor coupled to the tuner and the memory, the processor programmed to populate the keyword table with words by examining the program guide objects as they are received by the tuner and entering into the keyword table words that appear in the program guide objects more than a particular number of times, to compare each segment of the program guide data to the keyword table to determine which segments of the plurality of segments have the keyword therein, to link to the keyword to programs associated with the segments having the keyword therein and to display the keyword on a display screen.

11. The receiver of claim 10, wherein each program has an associated name and wherein the processor is further programmed to display on the display screen a list of names of programs associated with the segments having the keyword therein, when the keyword is selected on the display screen.

12. The receiver of claim 11, wherein the processor is further programmed to display on the display screen a program associated with a name form the list of names of programs when the name of that program is selected from the list of names of programs.

13. The receiver of claim 11, wherein each program has associated program information and wherein the processor is further programmed to display program information associated with a program when the name of that program is selected from the list of names of programs.

14. The receiver of claim 11, wherein the processor is further programmed to display the keyword in a highlighted fashion.

15. The receiver of claim 10, wherein the keyword comprises a name of an actor in a program.

16. The receiver of claim 10, wherein the keyword comprises a category of programs.

17. The receiver of claim 10, wherein the keyword comprises a name of a director of a program.

18. The receiver of claim 10, wherein the keyword table is stored in the memory by information sent over the broadcast channel.

19. A method for creating linking information from a program guide data transmitted on a broadcast channel, the program guide data having a plurality of segments, each segment of the plurality of segments associated with a program, some segments of the plurality of segments having a keyword therein, the method comprising the steps of:

receiving the program guide data from the broadcast channel;

generating a keyword table and populating the keyword table with words by examining the program guide objects as they are received by the tuner and entering into the keyword table words that appear in the program guide objects more than a particular number of times;

comparing the program guide data to the keyword table to determine which segments of the plurality of segments have the keyword therein;

linking the keyword to programs associated with the segments having the keyword therein; and displaying the keywords contained in the program guide data on a display screen.

20. The method of claim 19, wherein each program has an associated name, the method further comprising the step of displaying on the display screen a list of names of programs associated with the segments having the keyword therein, when the keyword is selected on the display screen.

21. The method of claim 20, further comprising the step of displaying on the display screen a program associated with a name from the list of names of programs when the name of that program is selected from the list of named of programs.

22. The method of claim 20, wherein each program has associated program information, the method further comprising the step of displaying program information associated with a program when the name of that program is selected from the list of names of programs.

23. The method of claim 20, further comprising the step of displaying the keyword in a highlighted fashion.

24. The method of claim 19, wherein the keyword comprises a name of an actor in a program.

25. The method of claim 19, wherein the keyword comprises a category of programs.

26. The method of claim 19, wherein the keyword comprises a name of a director of a program.

27. The method of claim 19, wherein the keyword table is stored in the memory by information sent over the broadcast channel.

* * * * *